J. V. CARTER.
FERTILIZER MIXER AND DISTRIBUTER.
APPLICATION FILED APR. 3, 1911.
999,297.
Patented Aug. 1, 1911.
2 SHEETS—SHEET 1.
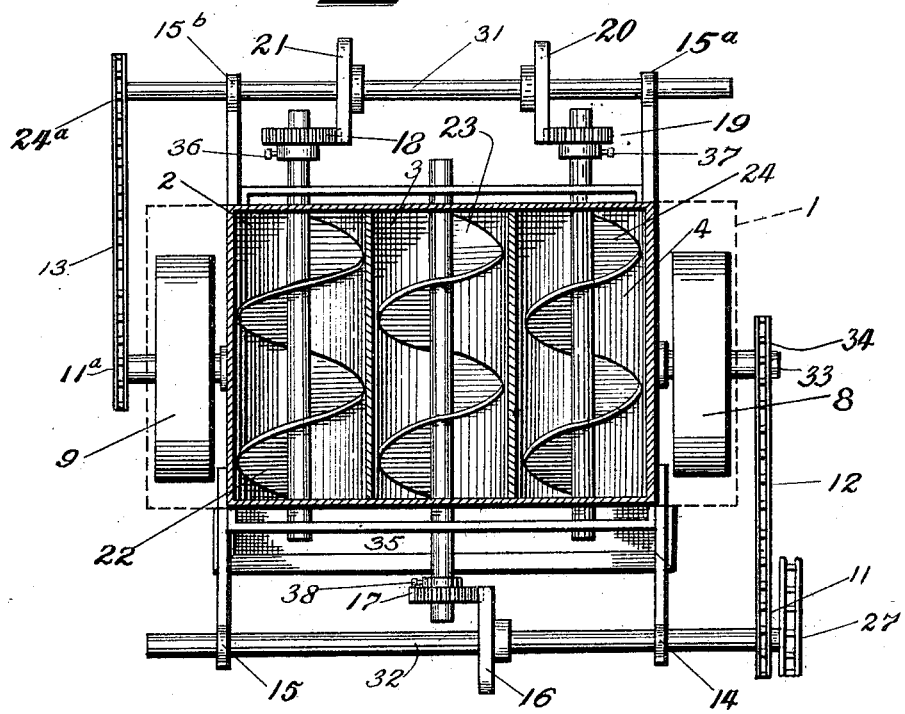
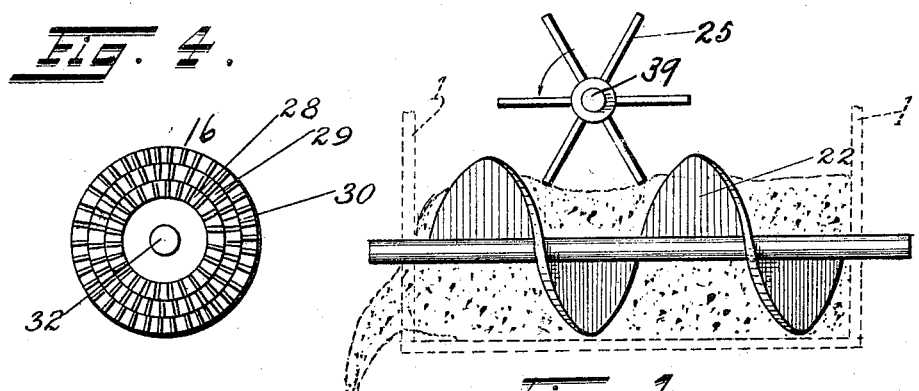
Inventor
James Vernon Carter.
Witnesses
By H. R. Van Deventer
Attorney

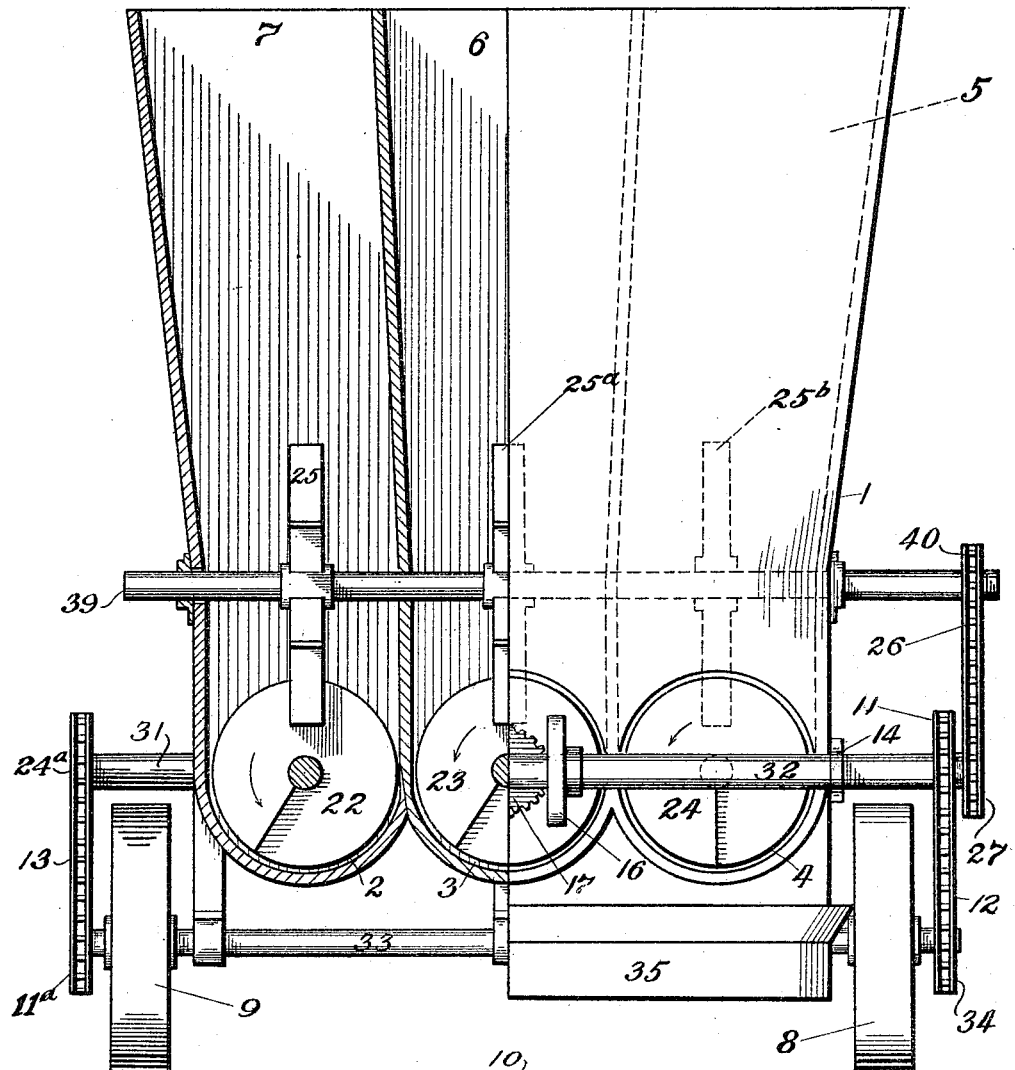

UNITED STATES PATENT OFFICE.

JAMES VERNON CARTER, OF ELLIOTT, SOUTH CAROLINA.

FERTILIZER MIXER AND DISTRIBUTER.

999,297.   Specification of Letters Patent.   Patented Aug. 1, 1911.

Application filed April 3, 1911. Serial No. 618,552.

*To all whom it may concern:*

Be it known that I, JAMES VERNON CARTER, a citizen of the United States, residing at Elliott, in the county of Lee and State of South Carolina, have invented certain new and useful Improvements in Fertilizer Mixers and Distributers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mixers for dry, semi-plastic or plastic materials, and more particularly to fertilizer mixers and distributers and the like, and consists of means whereby different substances or different grades of the same substance may be automatically combined in certain definite proportions without the necessity of measuring or weighing said materials to assure the proper proportions thereof; and further consists in a simple structure readily operated by unskilled labor and easy of construction and repair.

The objects of this invention will become apparent as it is more fully set forth.

It is well known that farmers have difficulty in properly distributing and mixing the fertilizing material required by their lands, mainly because of the expense involved in placing it on them, and the difficulty in obtaining a machine to mix it so as to be used suitably, and in cases where a machine is used to keep the same in running order and preventing it from clogging.

In this invention means are provided to loosely mix the material, and also to keep the same stirred up sufficiently to prevent its clogging the working parts of the machine, at the same time the stirring mechanism assists in propelling the material through the machine, in addition to properly mixing and distributing the fertilizing material.

In the accompanying drawings which illustrate by way of example, an embodiment of my invention: Figure 1 is a view of the rotating discharge members used in my machine. Fig. 2 is a view looking down on top of the machine with the upper portion of the hopper removed. Fig. 3 is an end view of the machine partly in section. Fig. 4 shows one of the special gears used for varying the speed of the discharge members.

The same letters and figures of reference denote the same parts wherever they are shown.

1 denotes the frame work or body of the machine. The lower portion of which consists of three chambers; 2, 3 and 4, in which are positioned the worm-like members 22, 23 and 24.

The hoppers 5, 6 and 7 communicate with the chambers 2, 3 and 4, as shown, and anything placed in said hoppers immediately falls into the discharge worms.

The wheels 8 and 9 attached to the axle 33 are provided for driving and supporting the machine. These wheels run over the ground indicated at 10 as the machine is drawn along. The motion of the axle 33 is transmitted by means of a sprocket 34 and chain 12 to the sprocket 11 and axle 32, which is supported in suitable bearings 14 and 15. Carried by said axle is the gear 16, having on its face a number of sets of teeth as shown at 28, 29 and 30, Fig. 4.

The axle of the center discharge member 23, is positioned at a right angle to the shaft 32 and is equipped at its end with a gear 17, which is adjustable on the axle by any suitable means, such as the set screw 38.

On the other end of the shaft 33 is mounted the sprocket 11ª; which, by means of the chain 13, transmits motion to the sprocket 24ª, carried by shaft 31 on which is mounted the gears 20 and 21, which are similar to gear 16, previously described. These mesh with gears 18 and 19, which are adjustable by means 36 and 37, on the shafts of the discharge members 22 and 24, in the same manner as gear 17, just described.

On one end of the shaft 32 is placed sprocket 27; which, by means of chain 26, transmits motion to sprocket 40 attached to shaft 39, carrying the cleaning members 25, 25ª and 25ᵇ. These cleaning members revolve between the worm-like discharge members and serve to prevent them from becoming clogged with the material placed in the hoppers; and as they revolve they prevent the hopper itself from becoming choked.

While I have shown the side shafts 31 and 32 supported in bearings 14, 15, 15ª and 15ᵇ, made in arms or brackets, attached to the side of case 1, it will be understood that any suitable means of support may be used.

In operation, various kinds of fertilizing material which it is desired to combine in certain proportions are placed in the hoppers 5, 6 and 7, the machine is now drawn over the ground and it will be seen that the materials in the hoppers will fall into the chambers 2, 3 and 4, in which the discharge members 22, 23 and 24 are rotated. The end of the chambers are open so that the material discharged therefrom can fall into the hopper 35 and be guided by the slanting sides thereof to the central portion thereof, and be thereby mixed together, because the three streams of material will be conveyed to this portion and will fall through the opening 35' provided in the bottom of the hopper 35, which is preferably funnel shaped, and from thence to the ground; and it will be observed that by adjusting the gears 17, 18 and 19 in relation to the gears 16, 20 and 21 that any one of the discharge members can be rotated at a different speed from the others, thereby causing more or less of the substance being fed through said discharge member to be deposited in the hopper 35; and thereby the various materials placed in the different hoppers are combined in any desired proportion.

While for the sake of illustration I have only shown three hoppers, with their associated discharge members, it will be understood that any number of hoppers and discharge members may be used. I also anticipate the use of any known gearing to give a varied number of revolutions to the various worm-like discharge members; so that the material from the various hoppers can be mixed in any desired quantities. And, while I have shown chains and sprockets as a means of transmitting motion from the main driving shaft to the various parts of my machine, it will be understood that any other suitable means of transmission may be used.

Having thus described my invention, I claim and desire to secure by Letters Patent the following:—

1. A mixer and distributer for fertilizer comprising in combination a plurality of hoppers for receiving materials, a plurality of chambers having openings in their end portions and disposed within said hoppers, a plurality of worm-wheels disposed and rotatably in the lower portion of said chambers and adapted to push said materials through said openings, a funnel shaped hopper arranged to receive and mix the materials from said chamber and distribute them on the ground, cleaning members disposed over said worms and adapted to actuate in the planes of the axes, means for actuating said worms and members, a carriage body for supporting the parts of the machine, and a plurality of wheels for carrying said body.

2. A mixer and distributer for fertilizer comprising in combination a plurality of hoppers for receiving materials, a plurality of chambers integrally formed with said hoppers and having their lower portions of circular shape and provided with end openings, a plurality of worms horizontally disposed in said chambers and adapted to eject said materials through said openings, a funnel shaped hopper arranged to receive and mix the materials from said chamber and distribute them on the ground, cleaning members disposed over said worms and arranged to actuate in the planes of the axes and in the valleys of the worms, means for supporting and actuating said worms and members, a carriage body for supporting the parts of the machine, an axle secured to said body and a plurality of wheels on said axle for propelling said body.

3. A mixer and distributer for fertilizer comprising in combination a plurality of hoppers for receiving materials, a plurality of chambers integrally formed with said hoppers and having their lower portions of circular shape and horizontally disposed and provided with openings in one end of each of said chambers, a plurality of rotatable worms, horizontally disposed in said lower portions and arranged to closely fit therein and to eject said materials through said openings, a funnel shaped hopper arranged to receive and mix the materials from said chambers and distribute them on the ground, cleaning members having a plurality of blades disposed in same plane as the axes and arranged to clean the worms and stir up the materials in the hoppers and push said material toward said openings, means for supporting and actuating said worms and members, a carriage body for supporting the parts of the machine, an axle secured to said body and a plurality of wheels on said axle for propelling said body.

4. A mixer and distributer comprising in combination a plurality of adjacent hoppers for receiving material, a chamber integrally formed with each hopper and having its bottom portion semi-cylindrically formed and horizontally disposed below the hopper and provided with a circular opening at one end for the exit of said material, a rotatable worm horizontally disposed in and closely fitting in said bottom portion and arranged to eject material through said opening, a funnel shaped hopper arranged to receive and converge materials from said hoppers and distribute them to the ground, a cleaning member having four radial flat blades disposed over each worm and adapted to stir up said materials and keep same from clogging in the worm, a common axle for said members, axles for said worms, bearing for said axles, means for actuating said axles in directions so as to push the materials toward said openings, a carriage body for supporting the parts of the machine, an axle secured to said body, plurality of ground wheels on said axles for propelling said body, transmission means on the last mentioned axle for actuating the members and worms at speeds proportional to the speed of the wheels.

In testimony whereof I hereunto affix my signature in the presence of two witnesses.

JAMES VERNON CARTER.

Witnesses:
H. R. VAN DEVENTER,
L. C. DIULSIUS.